Aug. 7, 1956     C. D. HILLMAN ET AL     2,757,567
THEODOLITE HAVING SCALE READING MEANS
Filed Dec. 5, 1951     5 Sheets-Sheet 1
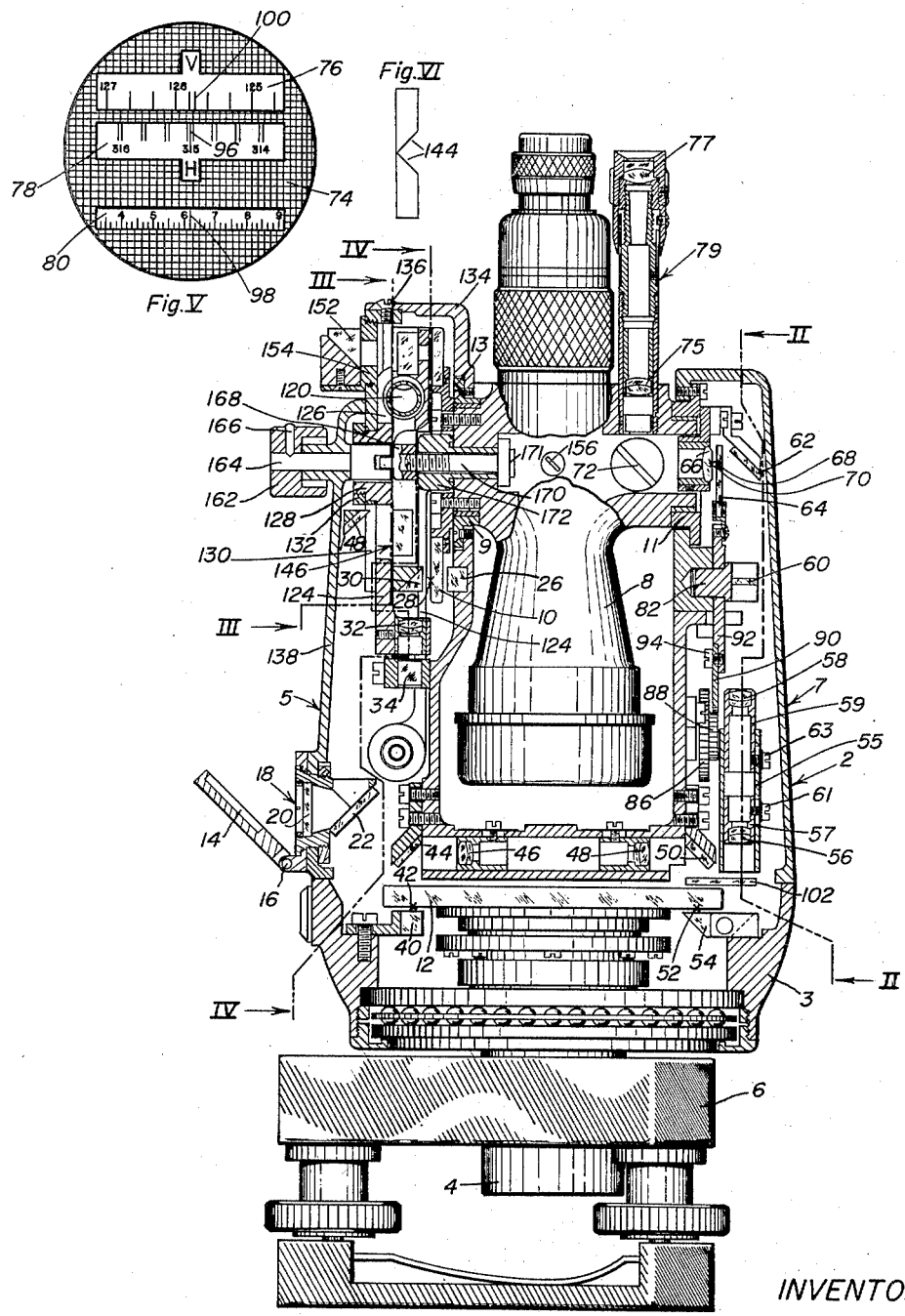
Fig. I
INVENTORS
CONWAY D. HILLMAN
ALLISTER L. BAKER
BY J. Russell Juten
ATTORNEY

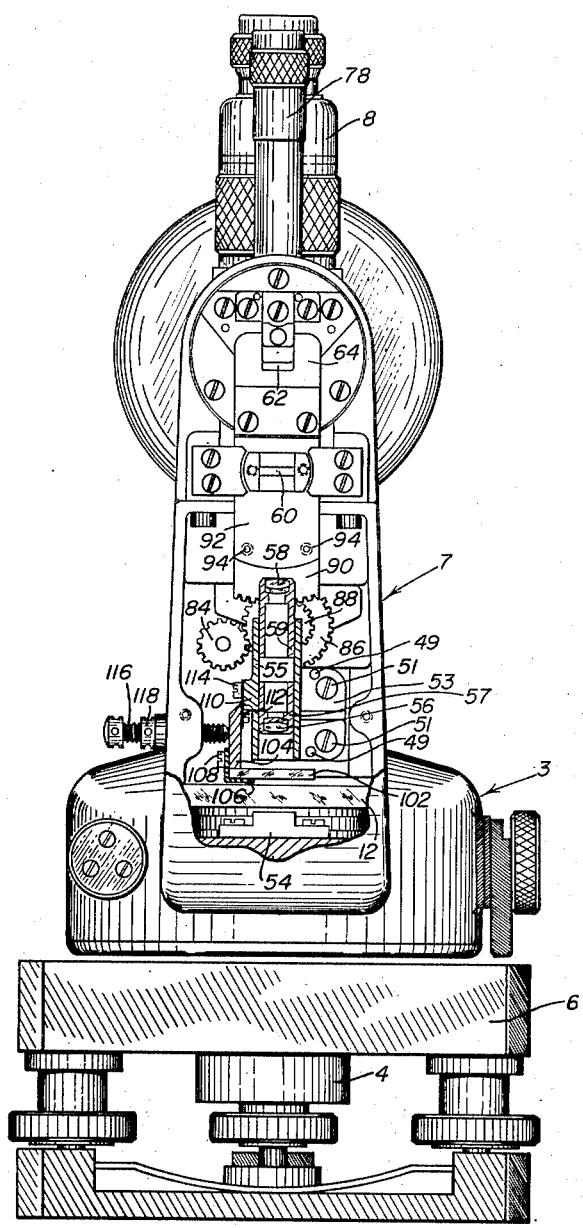
Fig. II

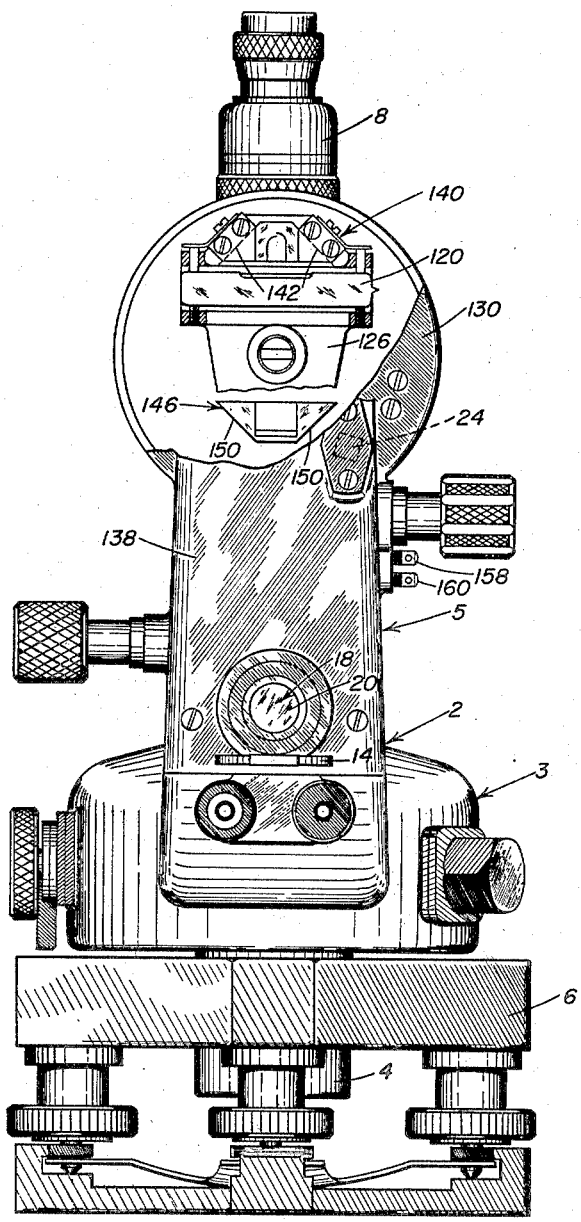
Fig. III
INVENTORS
CONWAY D. HILLMAN
ALLISTER L. BAKER
BY J. Russell Juten
ATTORNEY

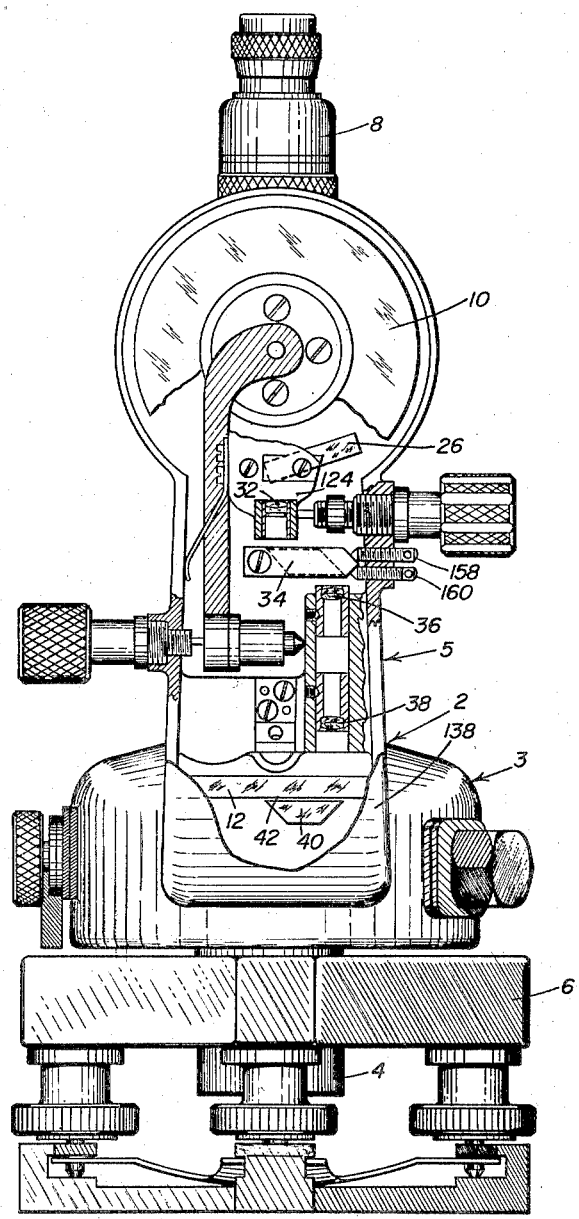
Fig. IV

Aug. 7, 1956 — C. D. HILLMAN ET AL — 2,757,567
THEODOLITE HAVING SCALE READING MEANS
Filed Dec. 5, 1951 — 5 Sheets-Sheet 5
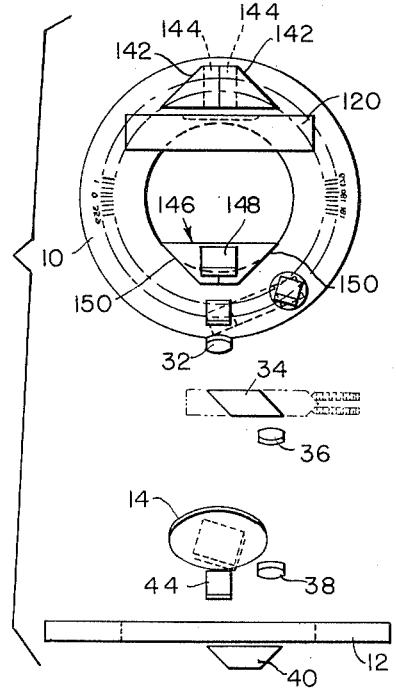
Fig VIII
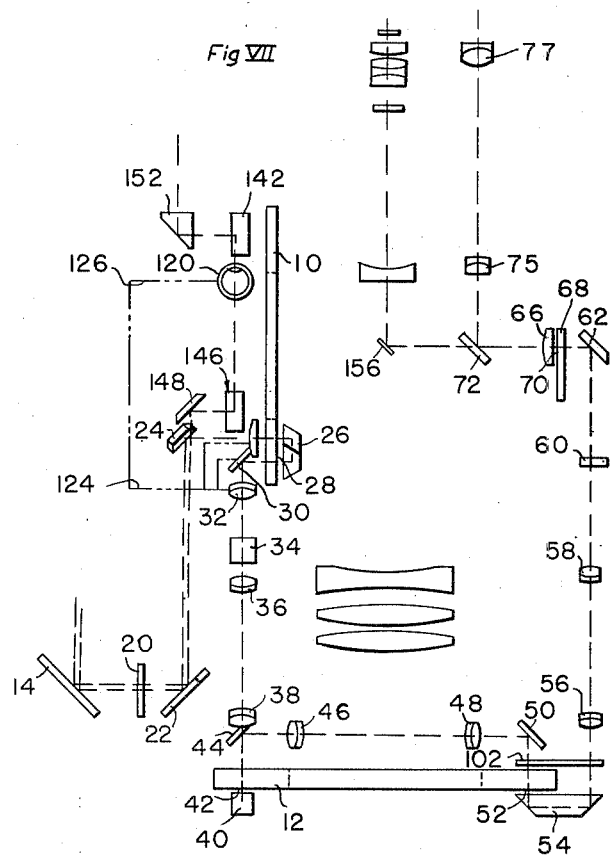
Fig VII
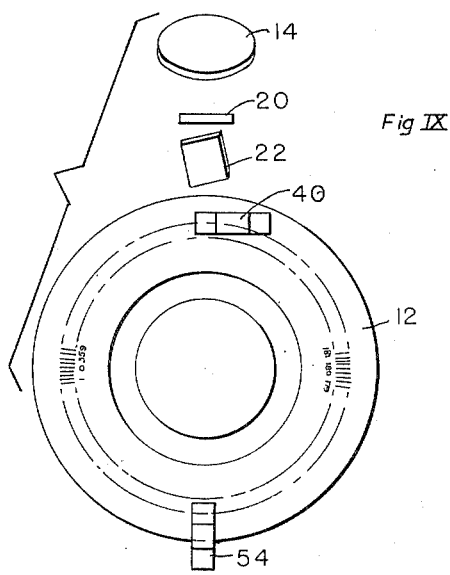
Fig IX
INVENTORS
CONWAY D. HILLMAN
ALLISTER L. BAKER
BY J. Russell Juten
ATTORNEY

United States Patent Office 2,757,567
Patented Aug. 7, 1956

2,757,567

THEODOLITE HAVING SCALE READING MEANS

Conway D. Hillman, Millburn, and Allister L. Baker, Denville, N. J., assignors to Keuffel & Esser Company, Hoboken, N. J., a corporation of New Jersey Application December 5, 1951, Serial No. 259,942

15 Claims. (Cl. 88—1)

This invention relates to surveying instruments or theodolites. In particular it relates to theodolites of the optically read type and of the type in which the horizontal scale for reading angles is averaged optically to eliminate eccentricity errors.

Prior art averaging theodolites have been very complicated and difficult and expensive to make. They have either used a complicated prism system for combining the readings of diametrically opposite scale lines or they have used a horizontal circle provided with two complete sets of concentric divisions. Since these divisions are very difficult to apply, doubly graduated scales are considerably more expensive. Reading systems have also been suggested in which the scales are applied to a cylindrical surface on the circles. However such systems have not been considered practical because of the difficulty of grinding and polishing accurate cylindrical surfaces and of applying graduations to them.

One object of the invention is to provide a simplified optical system for an averaging theodolite.

Another object of the invention is to provide an optical system for an averaging theodolite which requires that the averaged horizontal circle be provided with only one set of divisions on a flat horizontal surface thereof.

Another object of the invention is to provide an optical system for an averaging theodolite in which diametrically opposite graduation lines of the horizontal scale are imaged as parallel lines and in which means are provided for adjusting the spacing between the parallel lines simply and conveniently from outside the instrument.

Another object of the invention is to provide a fully enclosed scale reading optical system for a theodolite the optical path of which passes from a single light source through the vertical circle and continuously through diametrically opposite parts of the horizontal circle to a single eyepiece and by means of which it is possible to determine practically simultaneously the vertical circle reading and an averaged reading of the horizontal circle.

Another object of the invention is to provide a fully enclosed scale reading optical system for a theodolite combined with a fully enclosed altitude control bubble for the vertical circle.

Another object of the invention is to provide a fully enclosed scale reading system for a theodolite combined with simple means for adjusting the zero reading of the vertical circle when the telescope is pointed at the horizon.

Another object of the invention is to provide a fully enclosed optical theodolite having a single illumination source for the vertical circle, horizontal circle, control bubble and main telescope reticle.

These and other objects of the invention will be more fully understood by reference to the following description taken in connection with the accompanying drawing in which:

Fig. I is a view in front elevation mostly in section of the theodolite showing the new optical system.

Fig. II is a view in side elevation partly in section taken along the line II—II of Fig. I and looking in the direction of the arrows.

Fig. III is a view in side elevation partly in section taken along the broken line III—III of Fig. I and looking in the direction of the arrows.

Fig. IV is a view in side elevation partly in section taken along the broken line IV—IV of Fig. I and looking in the direction of the arrows.

Fig. V is a diagrammatic view showing the appearance of the scales etc., as seen through the eyepiece.

Fig. VI is a view in plan of the control bubble reading reflector unit.

Fig. VII, a diagrammatic view of the lens systems and reflecting means as seen from the front.

Fig. VIII, a similar diagrammatic view from the side, corresponding to Fig. III with the bubble viewing eyepiece and reflector omitted and showing the vertical circle.

Fig. IX, a similar diagrammatic view from the bottom showing the horizontal circle with the diametrically opposed graduations and the position indicating numbers.

Referring to Fig. I, the alidade housing 2 is generally hollow in order that it can carry within itself the necessary optical and mechanical parts which make up the instrument. The instrument is thus fully enclosed so that the essential parts are protected from dust, dirt and the like.

The alidade 2 is mounted for rotation about a vertical axis with respect to the base stud 4. The base stud 4 is adapted to fit into a central hole in the tribrach or leveling head 6 and may be secured rigidly thereto. The tribrach 6 is adapted to be mounted on a tripod not shown. The alidade housing 2 includes a base portion 3 and two upright standard portions 5 and 7. The telescope 8 is carried by the alidade 2 between standard portions 5 and 7 for rotation about a horizontal axis. For this purpose, telescope bearings 9 and 11 are provided in the alidade housing 2. The vertical circle 10 is mounted within the standard portion 5 for rotation with the telescope 8. Vertical circle 10 may be cemented to the mount 13 and the mount 13 screwed to the telescope casting as shown. The horizontal circle 12 is mounted within the base portion of the alidade for rotation about the same vertical axis as the alidade 2. The vertical and horizontal circles are preferably made of glass or other transparent material. Any suitable center system may be used for mounting the alidade 2 and horizontal circle 12 for rotation for example a center system of the type described in the copending application of Carl W. Keuffel and Allister L. Baker, Serial No. 185,016, filed September 15, 1950, now Patent No. 2,647,320, may be used.

With the aid of the scale reading system about to be described, the horizontal circle 12 indicates the position of the alidade housing 2 and the telescope 8 in azimuth with respect to the tribrach 6 and the vertical circle 10 indicates the position of the telescope 8 in elevation.

For daylight illumination, the reflector 14 is adjusted for maximum intensity of light passing through the scale reading system. The reflector 14 is mounted for this purpose to pivot about the axle 16 and to turn about the axis of the illumination opening 18. A light diffusing cover glass 20 which may also be a light condensing lens is mounted in the illumination opening 18. A lamp housing not shown containing a lamp operated by means of batteries or the like may be mounted over the illumination opening 18 for night illumination.

Light passing into the instrument through the cover glass 20 is reflected upward by the reflector 22 which is preferably a front aluminized mirror. The reflector 22 may be mounted for example by cementing it to its mount which may be made integrally with the mount for the cover glass 20 as shown. Some of the light passing upward from the reflector 22 passes obliquely to the reflector 24 (as shown in Fig. III) which reflects the light inward through the vertical circle 10 to the reversing prism 26 (shown in Fig. IV) which transmits the light to a point vertically below the horizontal axis of the instrument and directs it outward, again through the vertical circle at that point to illuminate the vertical scale at 28 (Fig. I) in silhouette. The light is then reflected downward by the reflector 30 through the control bubble lens 32 to the rhomboid prism 34 which displaces the line of sight to a parallel position (as shown in Fig. IV) and directs it through the imaging system consisting of the achromatic doublet lenses 36 and 38, to the reversing prism 40 which directs the light upward through the horizontal circle 12. In passing downward from the lens 38, the light may or may not pass through the horizontal circle 12 depending upon the relative dimensions of the parts. The imaging system consisting of the lenses 36 and 38 in combination with the control bubble lens 32 images the portion of the vertical scale at 28 onto the horizontal circle in the plane of the horizontal scale at 42. This imaging system may be replaced by an imaging system which is more or less complicated depending on the degree of optical correction required, etc. However, the combination of two cemented doublet lenses as shown at 36 and 38 has given good results. The horizontal scale 42 may be provided on either side of the horizontal circle 12 although the lower surface is preferred since dust cannot settle on this surface and become visible through the eye-piece.

The magnification of the lenses 32, 36 and 38 is adjusted preferably so that the spaces between images of the vertical circle graduation lines equal the spaces between corresponding horizontal circle graduation lines. To accomplish this the magnification of the lens system should equal the ratio of the radius of the horizontal circle divisions divided by the radius of the divisions on the vertical circle 10 measured from the horizontal axis.

As shown in Fig. I, the light passing upwardly from the horizontal circle 12 is reflected horizontally inward toward the vertical axis by the reflector 44 through the imaging system made up by the lenses 46 and 48. As in the case of the vertical circle imaging system, the lenses 46 and 48 may be replaced by any equivalent optical imaging system. The reflector 50 directs the light downward again through the horizontal circle 12. The imaging system made up of the lenses 46 and 48 images the image of the vertical scale and the portion of the horizontal scale at 42 to the diametrically opposite part of the horizontal scale at 52. The magnification of this lens system should be adjusted to unity.

The reversing prism 54 directs the light upward again through the third imaging system made up of the lenses 56 and 58 or equivalent optical imaging means. The light continues to pass upward through the plano-parallel tilting plate 60. The reflector 62 directs the light inward along the horizontal axis of the telescope through the micrometer glass 64 and the index glass 66. A micrometer scale is provided on the surface 68 of the micrometer glass 64 adjacent to the surface 70 of the index glass 66 which is provided with an index mark. The surfaces 68 and 70 are so close together as to practically lie in the same plane. The third imaging system made up by the lenses 56 and 58 or equivalent optical means images the image of the vertical scale 28, the image of the portion of the horizontal scale 42 and the portion of the horizontal scale at 52 into the focal plane determined by the surface 70.

After passing through the index glass 66, the light is reflected by the reflector 72 through the lenses 75 and 77 of the scale reading eyepiece 79. The lenses 75 and 77 may be replaced by any optically equivalent eyepiece. The reflector 72 and the eyepiece 79 both turn about the horizontal axis with the main telescope 8 so that all scales can always be read from a point near the main eyepiece, namely through the scale reading eyepiece 79.

It is an important part of the present invention that the scale portions 42 and 52 be diametrically opposite parts of a single protractor scale provided on a flat horizontal surface of the horizontal circle and not of different scales provided on the horizontal circle. The single protractor scale is numbered either at the inside or outside end of the lines. The imaging system made up of the lenses 46 and 48 and reflectors 44 and 50 images the portion of the scale 42 at 52 so that lines from opposite parts of the circle are alongside each other and parallel. Numbers of the imaged scale are at the opposite ends of the lines from the numbers of the portion of the scale at 52.

In this method of imaging only the pair of lines appearing at the center of the field of view will actually be parallel to each other. The lines nearer the edge of the field will be inclined to each other. However, this has been found not to be a disadvantage since in reading the lines are brought to the center of the field.

The way the various scales appear to an observer looking through the scale reading eyepiece 79 is shown in Fig. V. In the embodiment shown, the index glass 66 is provided with an opaque area 74 forming the clear block openings 76, 78 and 80. In the upper block opening 76, the letter V is provided on the index glass to indicate that the vertical scale readings are made in this opening. The letter H is provided on the index glass in the middle block opening 78 to indicate that the horizontal scale readings are made in this block opening. The micrometer scale 68 provided on the micrometer glass 64 is seen through the lower block opening of the index glass 66.

The micrometer glass 64 is mounted for rotation with the plano-parallel plate 60 about the axle 82. The micrometer glass 64 may have an oblong shape and the micrometer scale 68 is provided with graduations radiating from the axis of axle 82 in an arcuate band. The plano-parallel plate 60 and micrometer glass 64 are turned about axle 82 by means of the gears shown in Fig. II in order to obtain a fine motion. Gear 84 is turned by means of a hand knob (not shown) provided outside the standard portion 7 of the alidade 2. Gear 84 turns gear 86 which is mounted on the same axle as gear 88. The latter gear turns the parallel plate 60 and micrometer scale 64 by means of the gear segment 90 secured to the holding plate 92 by the screws 94.

The turning of the plano-parallel plate 60 displaces the images of the vertical and horizontal scale lines on the index glass and the amount of this displacement is measured on the micrometer scale which is also seen through the eyepiece 79. For greatest accuracy, the micrometer scale 68 is not a uniform scale but is calibrated to represent subdivisions of the horizontal scale and the vertical scale 28. The run of the micrometer scale represents an angle equivalent to the angle between the closest divisions on the horizontal and vertical scales. However, extra divisions may be provided beyond the ends of the micrometer scale.

A reading of the horizontal scale is taken by turning the micrometer knob to tilt the plano-parallel plate 60 and move the nearest parallel images of the diametrically opposite horizontal scale divisions until the index line 96 provided on the index glass 66 in the center block opening 78 bisects the space between these parallel horizontal circle lines. The subdivision reading of the micrometer scale read at the index line 98 provided on the index glass 66 in the lower block opening 80 is then added to the reading for the particular pair of lines of the horizontal scale which were lined up with the index mark.

A reading of the vertical scale is taken by turning the micrometer knob to tilt the plano-parallel plate 60 and move the nearest image of a vertical circle line until it bisects the space between the parallel index lines 100 provided on the index glass 66 in the upper block opening 76. The subdivision reading of the micrometer scale read at the index line 98 provided on the index glass 66 in the lower block opening 80 is then added to the reading for the particular line of the vertical scale which was lined up between the index lines.

In the embodiment of the invention shown in Fig. V, the horizontal and vertical circles are graduated to every 20 minutes of arc and the run of the micrometer scale covers 20 minutes and it is graduated down to 10 seconds of arc. By estimation readings can be taken to the nearest second of arc. It should of course be understood that other methods of graduation may be used.

The magnification of the lens system made up by the lenses 56 and 58 is adjusted so that the run of the micrometer scale accurately covers the space between adjacent lines or pairs of lines on the vertical and horizontal scales. The lenses 56 and 58 may for example be mounted in tubes 57 and 59 which in turn fit into tube 55 which is secured in the proper place within the standard portion 7 of the alidade housing 2 for example by means of the integrally cast bracket 53 (Fig. II) secured by screws 51 to the inner wall of the standard portion 7. When properly adjusted the bracket 53 may be pinned as by pins 49. The tubes 57 and 59 are slidable in the tube 55 but are held in adjusted position by the screws 61 and 63 which pass through slots in the tube 55 and are threaded into the tubes 57 and 59. Because of the individual mounts and slots the space between the lenses as well as their positions with respect to the circle 12 and index glass 66 may be adjusted for good focus and the required magnification. The lens system made up by lenses 46 and 48 and the lens system made up by lenses 36 and 38 may be adjustable in the same manner.

A plano-parallel transmitting plate 102 intersects the rays passing from the lens 48 to the horizontal scale 52 and also the rays passing in the other direction from the scale at 52 to the lens 56. This plano-parallel plate 102 is pivoted about an axis parallel to the horizontal axis of the instrument. In the embodiment shown (Fig. II) the plate 102 is attached to the arm 104 by the bracket 106 and screws 108. The pivoting of the arm 104 is accomplished by the flexible member 110 secured to the arm 104 and tube 55 by screws 112 and 114. The screw 116 threaded in the wall of the alidade housing 2 bears against the arm 104 to bend the flexible member 110 and tilt the plano-parallel plate 102. A lock nut 118 is provided to lock the screw 116 in adjusted position.

Tilting of the plano-parallel plate 102 changes the spacing between the parallel images of the horizontal scale lines at the index glass 66. By intersecting both the downward and upward beams of light, the plate does not change the position of the image of the vertical scale lines nor of the horizontal scale lines coming from the portion of the horizontal circle at 42 but merely changes the position of the horizontal scale lines coming from the portion of the horizontal circle at 52. The zero setting of the vertical scale is therefore unaffected by the spacing adjustment.

The control bubble adjustment is based on the teaching of Patent No. 2,498,273 issued to Conway D. Hillman on February 21, 1950, but the basic construction shown in the patent has been improved in order to make the bubble 120 and operating parts fully enclosed. The control bubble lens 32, the reflector 30 and the control bubble 120 are mounted on arms 124 and 126 as shown. Arms 124 and 126 are integrally formed with journal portion 128 bearing within a hole in the plate 130 for rotation about the horizontal axis of the instrument. The arms 124 and 126 and journal portion 128 are held in position by the nut 132. The plate 130 forms part of the outer wall of the standard portion 5 and is secured to the main alidade casting 134 as by means of screws 136. The cover 138 forming the rest of the outer wall of a standard portion 5 is secured to the plate 130 and the main alidade casting 134. The upper end of arm 126 spreads out at its upper end as shown in Fig. III to support the control bubble 120 at its ends permitting light to reach the central portion of the bubble from below. The arm 126 also carries the control bubble reading reflector unit 140 which is preferably made up of two prisms having reflecting surfaces 142 (Fig. III) and reflecting surfaces 144 (Fig. VI). Light from the ends of the bubble is projected upward to the reflecting surfaces 142 which project the light horizontally inward to the reflecting surfaces 144, which in turn reflect the light out of the instrument to the prism 152 so that the superimposed images of the ends of the bubble can be viewed through the prism 152.

The control bubble illumination reflector unit 146 may be of the same type as the control bubble reading reflector unit 140 but it is held in upside down relation to reading unit 140 on the arm 124. Since the illumination unit does not require as high a degree of accuracy as the reading unit, the prisms for the illumination unit may be made of plastic and the prisms for the reading unit may be ground and polished optical glass. Light for illuminating the control bubble is reflected directly upward from the reflector 22 to the reflector 148 which directs the light inward to the control bubble illumination reflector unit 146. The illumination reflector unit 146 directs the light upward from the reflecting surfaces 150 (Fig. III) through the control bubble 120 to the reflecting surfaces 142 which direct the light inward to the reflecting surfaces 144 (Fig. VI) which latter in turn direct the light outward parallel to the horizontal axis to the right angle prism 152 (Fig. I). The right angle prism 152 is pivoted about axle 154 so that it can direct the light vertically as shown or horizontally in either direction for convenient observation parallel to the line of sight of the telescope axis.

The focal length of the lens 32 is chosen to place the virtual image of the vertical scale 28 at the horizontal axis of the instrument for the reasons given in the patent identified above.

The reflector 72 is partially light transmitting so that some light will reach the reflector 156 for night illumination of the main telescope. For this purpose the reflector 72 may be provided with a thin partially transmitting coat of aluminum or a small light transmitting opening may be provided in the reflecting coating. The reflector 156 directs the light to illuminate the reticle of the main telescope for night time use but for daytime use it may be turned parallel to the line of sight for minimum interference with the image forming rays. The mirror 156 preferably has a concave reflecting surface.

After passing through the control bubble lens 32 the light from the vertical scale 28 passes through the rhomboid prism 34 as previously described. The adjusting screws 158 and 160 shown in Fig. IV are provided to tilt the prism 34 and shift the image of the vertical scale lines at the focal plane of the index glass 66. Thus by means of the adjusting screws 158 and 160, the zero line of the vertical scale can be made to line up between the parallel index lines 100 when the control bubble is adjusted and the micrometer scale reading is zero in order to adjust the zero reading of the vertical scale.

The telescope clamp devised to fit in between the control bubble construction is shown in Fig. I. The knob 162 is fastened to the axle 164 by set screw 166. Axle 164 is journaled in the cover 138 and has an enlarged end inside the standard portion 5 of the alidade provided with a slot for engaging the clamp nut 168 as shown. The clamp screw 170 fits inside the clamp shoe 172 which in turn fits in a hole provided in the telescope casting as shown. The clamp shoe 172 is provided with an enlarged end engaging an annular surface on the telescope casting. The clamp screw 170 is provided with an enlarged head on the opposite end for engaging an internal annular surface on the telescope casting. Upon tightening the nut 168, the enlarged end of the clamp shoe 172 and the head of the clamp screw are forced against the adjacent surfaces of the telescope casting to hold the telescope locked in position. The key 171 is provided to prevent turning of the clamp screw 170.

In the construction shown and described, the numbers imaged from the portion of the horizontal scale at 42 are hidden by the portion of the opaque coating 74 on the index glass between the block openings 76 and 78. Other means of masking this set of numbers are possible. For example, if the reflector 44 is placed close enough to the focal plane 42, it could be provided with a front aluminized surface which is cut off so as to reflect the lines but not the numbers. The back surface could then also be aluminized for reflecting light to form the vertical scale image and to illuminate the numbers at 52. The numbers at 42 would thus be lost by successive reflection within the mirror 44 between the surfaces thereof.

Having thus described the invention, what is claimed is:

1. A theodolite comprising an alidade mounted for rotation about a vertical axis, a telescope carried by said alidade mounted for rotation about a horizontal axis, a transparent vertical circle for indicating the elevation of said telescope, a transparent horizontal circle for indicating the position of said alidade in azimuth, said horizontal circle having on a flat surface thereof a single protractor scale provided with position indicating numbers on one end of the graduation lines making up said protractor scale, said numbers being located on diametrically opposed portions of said horizontal circle, a first lens system and reflecting means imaging graduation lines of said vertical circle onto said surface of said horizontal circle having said protractor scale, a second lens system and reflecting means imaging the imaged graduation lines of the vertical circle and the graduation lines of said single protractor scale on said horizontal circle, said second lens system and reflecting means being so arranged as to image the graduation lines of said horizontal protractor scale alongside of and spaced from and parallel to 180° opposite graduation lines on said horizontal circle, means for masking out the position indicating numbers on one of the opposed portions of said horizontal scale, and optical micrometer means for reading the imaged vertical circle lines and the parallel horizontal circle lines.

2. A theodolite comprising an alidade mounted for rotation about a vertical axis, a telescope carried by said alidade mounted for rotation about a horizontal axis, a transparent vertical circle for indicating the elevation of said telescope, a transparent horizontal circle for indicating the position of said alidade in azimuth, said horizontal circle having on a flat surface thereof a single protractor scale provided with position indicating numbers on one end of the graduation lines making up said protractor scale, said numbers being located on diametrically opposed portions of said horizontal circle, a first lens system and reflecting means imaging graduation lines of said vertical circle onto said surface of said horizontal circle having said protractor scale, a second lens system and reflecting means imaging the imaged graduation lines of the vertical circle and the graduation lines of said single protractor scale on said horizontal circle, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, an index glass, a third lens system imaging the imaged graduation lines of the vertical circle and the parallel graduation lines and numbers of said horizontal circle onto said index glass, means on said index glass for masking out the position indicating numbers on one of the opposed portions of said horizontal scale and optical micrometer means for reading the vertical circle lines and the parallel horizontal circle lines imaged on said index glass.

3. A theodolite comprising an alidade mounted for rotation about a vertical axis, a telescope carried by said alidade mounted for rotation about a horizontal axis, a transparent vertical circle for indicating the elevation of said telescope, a transparent horizontal circle for indicating the position of said alidade in azimuth, said horizontal circle having on a flat surface thereof a single protractor scale provided with position indicating numbers on one end of the graduation lines making up said protractor scale, said numbers being located on diametrically opposed portions of said horizontal circle, a first lens system and reflecting means imaging graduation lines of said vertical circle onto said surface of said horizontal circle having said protractor scale, a second lens system and reflecting means comprising an even number of reflecting surfaces imaging the imaged graduation lines of the vertical circle and the graduation lines of said single protractor scale on said horizontal circle, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, an index glass, a third lens system imaging the imaged graduation lines of the vertical circle and the parallel graduation lines and numbers of said horizontal circle onto said index glass, means on said index glass for masking out the position indicating numbers on one of the opposed portions of said horizontal scale and a plano-parallel tilting plate in the optical path of said third lens system for displacing the vertical circle lines and the parallel horizontal circle lines imaged on said index glass to obtain a reading.

4. A theodolite comprising an alidade mounted for rotation about a vertical axis, a telescope carried by said alidade mounted for rotation about a horizontal axis, a transparent vertical circle for indicating the elevation of said telescope, a transparent horizontal circle for indicating the position of said alidade in azimuth, said horizontal circle having on a flat surface thereof a single protractor scale provided with position indicating numbers on one end of the graduation lines making up said protractor scale, said numbers being located on diametrically opposed portions of said horizontal circle, a first lens system and reflecting means imaging graduation lines of said vertical circle onto said surface of said horizontal circle having said protractor scale, a second lens system and reflecting means imaging the imaged graduation lines of the vertical circle and the graduation lines of said single protractor scale on said horizontal circle, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, an index glass, a third lens system imaging the imaged graduation lines of the vertical circle and the parallel graduation lines and numbers of said horizontal circle onto said index glass, means on said index glass for masking out the position indicating numbers on one of the opposed portions of said horizontal scale, a plano-parallel tilting plate in the optical path of said third lens system for displacing the vertical circle lines and the parallel horizontal circle lines imaged on said index glass and a micrometer scale adjacent said index glass measuring the tilt of said plano-parallel tilting plate for indicating subdivision readings of the horizontal and vertical circles.

5. A theodolite comprising an alidade housing having a base portion and two upright standard portions, a telescope mounted between said standard portions for rotation about a horizontal axis, a transparent horizontal circle for indicating the position of said alidade in azimuth mounted within said base portion, said horizontal circle having on a flat surface thereof a single protractor scale provided with position indicating numbers on one end of the graduation lines making up said protractor scale, said numbers being located on diametrically opposed portions of said horizontal circle, a transparent vertical circle secured to said telescope for rotation within one of said upright standard portions for indicating the elevation of said telescope, said alidade housing having a light transmitting opening in said standard portion within which said vertical circle rotates, means for directing light from said light transmitting opening to said vertical circle, means for directing light from said vertical circle downward within the standard portion within which said vertical circle rotates toward said horizontal circle, a first lens system in the path of the downward directed light imaging graduation lines of said vertical circle onto said surface of said horizontal circle having said protractor scale, means for directing light upward from said horizontal circle and above the center of said horizontal circle within said base portion, a second lens system and reflecting means comprising an even number of reflecting surfaces in the path of said light passing above the center of said horizontal circle imaging the imaged graduation lines of the vertical circle and the graduation lines of said single protractor scale on said horizontal circle, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, means for masking out the position indicating numbers on one of the opposed portions of said horizontal scale and optical micrometer means for reading the imaged vertical circle lines and the parallel horizontal circle lines.

6. A theodolite comprising an alidade housing having a base portion and two upright standard portions, a telescope mounted between said standard portions for rotation about a horizontal axis, a transparent horizontal circle for indicating the position of said alidade in azimuth mounted within said base portion, said horizontal circle having on a flat surface thereof a single protractor scale provided with position indicating numbers on one end of the graduation lines making up said protractor scale, said numbers being located on diametrically opposed portions of said horizontal circle, a transparent vertical circle secured to said telescope for rotation within one of said upright standard portions for indicating the elevation of said telescope, said alidade housing having a light transmitting opening in said standard portion within which said vertical circle rotates, means for directing light from said light transmitting opening to said vertical circle, means for directing light from said vertical circle downward within the standard portion within which said vertical circle rotates toward said horizontal circle, a first lens system in the path of the downward directed light imaging graduation lines of said vertical circle onto said surface of said horizontal circle having said protractor scale, a reflector above said horizontal circle for directing light from said horizontal circle above the center of the horizontal circle, a reflector above the diametrically opposite part of the horizontal circle directing the light downward again to the horizontal circle, a second lens system in the path of said light passing above the center of said horizontal circle between said reflectors imaging the imaged graduation lines of the vertical circle and the graduation lines of said single protractor scale on said horizontal circle, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, means for masking out the position indicating numbers on one of the opposed portions of said horizontal scale and optical micrometer means for reading the imaged vertical circle lines and the parallel horizontal circle lines.

7. A theodolite comprising an alidade housing having a base portion and two upright standard portions, a telescope mounted between said standard portions for rotation about a horizontal axis, a transparent horizontal circle for indicating the position of said alidade in azimuth mounted within said base portion, said horizontal circle having on a flat surface thereof a single protractor scale provided with position indicating numbers on one end of the graduation lines making up said protractor scale, said numbers being located on diametrically opposed portions of said horizontal circle, a transparent vertical circle secured to said telescope for rotation within one of said upright standard portions for indicating the elevation of said telescope, said alidade housing having a light transmitting opening in said standard portion within which said vertical circle rotates, means for directing light from said light transmitting opening to said vertical circle, means for directing light from said vertical circle downward within the standard portion within which said vertical circle rotates toward said horizontal circle, a first lens system in the path of the downward directed light imaging graduation lines of said vertical circle onto said surface of said horizontal circle having said protractor scale, means for directing light upward from said horizontal circle and above the center of said horizontal circle within said base portion, a second lens system and reflecting means comprising an even number of reflecting surfaces in the path of said light passing above the center of said horizontal circle imaging the imaged graduation lines of the vertical circle and the graduation lines of said single protractor scale on said horizontal circle, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, means for directing the light from said horizontal circle upward through the other standard portion of the alidade, an index glass at the upper end of said other standard portion, a third lens system in the path of the upward projected light in said other standard portion imaging the imaged graduation lines of the vertical circle and the parallel graduation lines and numbers of said horizontal circle onto said index glass, means on said index glass for masking out the position indicating numbers on one of the opposed portions on said horizontal scale, a plano-parallel tilting plate in the optical path of said third lens system for displacing the vertical circle lines and the parallel horizontal circle lines imaged on said index glass and a micrometer scale adjacent said index glass pivoted with said plano-parallel tilting plate for indicating subdivision readings of the horizontal and vertical circles.

8. A theodolite comprising an alidade housing having a base portion and two upright standard portions, a telescope mounted between said standard portions for rotation about a horizontal axis, a transparent horizontal circle for indicating the position of said alidade in azimuth mounted within said base portion, said horizontal circle having on a flat surface thereof a single protractor scale provided with position indicating numbers on one end of the graduation lines making up said protractor scale, said numbers being located on diametrically opposed portions of said horizontal circle, a transparent vertical circle secured to said telescope for rotation within one of said upright standard portions for indicating the elevation of said telescope, said alidade housing having a light transmitting opening in said standard portion within which said vertical circle rotates, means for directing light from said light transmitting opening to said vertical circle, means for directing light from said vertical circle downward within the standard portion within which said vertical circle rotates toward said horizontal circle, a first lens system in the path of the downward directed light imaging graduation lines of said vertical circle onto said surface of said horizontal circle having said protractor scale, means for directing light upward from said horizontal circle and above the center of said horizontal circle within said base portion, a second lens system and reflecting means in the path of said light passing above the center of said horizontal circle imaging the imaged graduation lines of the vertical circle and the graduation lines of said single protractor scale on said horizontal circle, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, means for directing the light from said horizontal circle upward through the other standard portion of the alidade, a reflector for directing the upward passing light inward along the horizontal axis of the telescope, an index glass in the optical path at the upper end of said other standard portion, a third lens system in the path of the upward projected light in said other standard portion imaging the imaged graduation lines of the vertical circle and the parallel graduation lines and numbers of said horizontal circle onto said index glass, means on said index glass for masking out the position indicating numbers on one of the opposed portions of said horizontal scale, a plano-parallel tilting plate in the optical path of said third lens system for displacing the vertical circle lines and the parallel horizontal circle lines imaged on said index glass, a micrometer scale adjacent said index glass pivoted with said plano-parallel tilting plate for indicating subdivision readings of the horizontal and vertical circles, a reflector for directing the light passing inward along the horizontal axis after passing through said index glass and micrometer scale in a direction parallel to the line of sight of said telescope and an eyepiece adjacent the eyepiece of the main telescope for observing said index glass.

9. A theodolite comprising an alidade mounted for rotation about a vertical axis, a telescope carried by said alidade mounted for rotation about a horizontal axis, a transparent vertical circle for indicating the elevation of said telescope, a transparent horizontal circle for indicating the position of said alidade in azimuth, said horizontal circle having on a flat surface thereof a single protractor scale provided with position indicating numbers on one end of the graduation lines making up said protractor scale, said numbers being located on diametrically opposed portions of said horizontal circle, a first lens system and reflecting means imaging graduation lines of said vertical circle onto said surface of said horizontal circle having said protractor scale, the magnification of said first lens system being adjusted to equal the ratio of the radius of the horizontal circle divisions divided by the radius at which the graduations are provided on the vertical circle, a second lens system and reflecting means imaging the imaged graduation lines of the vertical circle and the graduation lines of said single protractor scale on said horizontal circle, the magnification of said second lens system being equal to unity, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, means for masking out the position indicating numbers on one of the opposed portions of said horizontal scale and optical micrometer means for reading the imaged vertical circle lines and the parallel horizontal circle lines.

10. A theodolite comprising an alidade mounted for rotation about a vertical axis, a telescope carried by said alidade mounted for rotation about a horizontal axis, a transparent vertical circle for indicating the elevation of said telescope, a transparent horizontal circle for indicating the position of said alidade in azimuth, said horizontal circle having on a flat surface thereof a single protractor scale provided with position indicating numbers on one end of the graduation lines making up said protractor scale, said numbers being located on diametrically opposed portions of said horizontal circle, a first lens system and reflecting means imaging graduation lines of said vertical circle onto said surface of said horizontal circle having said protractor scale, the magnification of said first lens system being adjusted to equal the ratio of the radius of the horizontal circle divisions divided by the radius at which the graduations are provided on the vertical circle, a second lens system and reflecting means imaging the imaged graduation lines of the vertical circle and the graduation lines of said single protractor scale on said horizontal circle, the magnification of said second lens system being equal to unity, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, an index glass, a third lens system imaging the imaged graduation lines of the vertical circle and the parallel graduation lines and numbers of said horizontal circle onto said index glass, means on said index glass for masking out the position indicating numbers on one of the opposed portions of said horizontal scale and optical micrometer means for reading the vertical circle lines and the parallel horizontal circle lines imaged on said index glass, the magnification of said third lens system being adjusted so that the displacement of vertical and horizontal lines by the plano-parallel tilting plate will equal the distance between the closest graduations when the tilting plate is turned through the complete run of the micrometer scale.

11. A theodolite comprising an alidade mounted for rotation about a vertical axis, a telescope carried by said alidade mounted for rotation about a horizontal axis, a transparent vertical circle for indicating the elevation of said telescope, a transparent horizontal circle for indicating the position of said alidade in azimuth, said horizontal circle having on a flat surface thereof a single protractor scale provided with position indicating numbers on one end of the graduation lines making up said protractor scale, said numbers being located on diametrically opposed portions of said horizontal circle, a first lens system and reflecting means imaging graduation lines of said vertical circle onto said surface of said horizontal circle having said protractor scale, a second lens system and reflecting means imaging the imaged graduation lines of the vertical circle and the graduation lines of said single protractor scale on said horizontal circle, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, means for masking out the position indicating numbers on one of the opposed portions of said horizontal scale, a plano-parallel tilting plate intersecting the light imaged by said second lens system for adjusting the spacing between the parallel graduation lines of the horizontal circle, and optical micrometer means for reading the imaged vertical circle lines and the parallel horizontal circle lines.

12. A theodolite comprising an alidade mounted for rotation about a vertical axis, a telescope carried by said alidade mounted for rotation about a horizontal axis, a transparent vertical circle for indicating the elevation of said telescope, a transparent horizontal circle for indicating the position of said alidade in azimuth, said horizontal circle having on a flat surface thereof a single protractor scale provided with position indicating numbers on one end of the graduation lines making up said protractor scale, said numbers being located on diametrically opposed portions of said horizontal circle, a first lens system and reflecting means imaging graduation lines of said vertical circle onto said surface of said horizontal circle having said protractor scale, a second lens system and reflecting means imaging the imaged graduation lines of the vertical circle and the graduation lines of said single protractor scale on said horizontal circle, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, an index glass, a third lens system imaging the imaged graduation lines of the vertical circle and the parallel graduation lines and numbers of said horizontal circle onto said index glass, a plano-parallel tilting plate intersecting the light imaged by said second lens system and also the light imaged by said third lens system for adjusting the spacing between the parallel graduation lines of the horizontal circle without affecting the zero reading of the vertical circle, means on said index glass for masking out the position indicating numbers on one of the opposed portions of said horizontal scale and optical micrometer means for reading the vertical circle lines and the parallel horizontal circle lines imaged on said index glass.

13. A theodolite comprising an alidade housing having a base portion and two upright standard portions, a telescope mounted between said standard portions for rotation about a horizontal axis, a transparent horizontal circle for indicating the position of said alidade in azimuth mounted within said base portion, said horizontal circle having on a flat surface thereof a single protractor scale provided with position indicating numbers on one end of the graduation lines making up said protractor scale, said numbers being located on diametrically opposed portions of said horizontal circle, a transparent vertical circle secured to said telescope for rotation within one of said upright standard portions for indicating the elevation of said telescope, a control bubble within the same standard portion of said alidade housing as said vertical circle, a control bubble lens within said same standard portion pivoted with said control bubble about the horizontal axis of the instrument, a pair of illuminating prisms below said control bubble, a pair of reading prisms above said control bubble, said alidade housing having a light transmitting opening in said standard portion within which said vertical circle rotates, means for directing light from said light transmitting opening to said illuminating prisms, a right angle reflector for viewing the light coming from said reading prisms, means for directing light from said same light transmitting opening to said vertical circle, means for directing light from said vertical circle downward within the standard portion within which said vertical circle rotates toward said horizontal circle, a first lens system including said control bubble lens in the path of the downward directed light imaging graduation lines of said vertical circle onto said surface of said horizontal circle having said protractor scale, means for directing light upward from said horizontal circle and above the center of said horizontal circle within said base portion, a second lens system and reflecting means in the path of said light passing above the center of said horizontal circle imaging the imaged graduation lines of said single protractor scale on said horizontal circle, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, means for masking out the position indicating numbers on one of the opposed portions of said horizontal scale and optical micrometer means for reading the imaged vertical circle lines and the parallel horizontal circle lines.

14. A theodolite comprising an alidade mounted for rotation about a vertical axis, a telescope carried by said alidade mounted for rotation about a horizontal axis, a transparent vertical circle for indicating the elevation of said telescope, a transparent horizontal circle for indicating the position of said alidade in azimuth, said horizontal circle having on a flat surface thereof a single protractor scale provided with position indicating numbers on one end of the graduation lines making up said protractor scale, said numbers being located on diametrically opposed portions of said horizontal circle, a first lens system and reflecting means imaging graduation lines of said vertical circle onto said surface of said horizontal circle having said protractor scale, a rhomboid prism in the path of the light imaged by said first lens system, means for tilting said rhomboid prism to adjust the zero reading of the vertical circle, a second lens system and reflecting means imaging the imaged graduation lines of the vertical circle and the graduation lines of said single protractor scale on said horizontal circle, said second lens system and reflecting means being so arranged as to image the graduation lines of said horizontal protractor scale along side of and spaced from and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, means for masking out the position indicating numbers on one of the opposed portions of said horizontal scale and optical micrometer means for reading the imaged vertical circle lines and the parallel horizontal circle lines.

15. A theodolite comprising an alidade housing having a base portion and two upright standard portions, a telescope mounted between said standard portions for rotation about a horizontal axis, a transparent horizontal circle for indicating the position of said alidade in azimuth mounted within said base portion, said horizontal circle having on a flat surface thereof a single protractor scale provided with numbers on one end of the graduation lines making up said protractor scale, a transparent vertical circle secured to said telescope for rotation within one of said upright standard portions for indicating the elevation of said telescope, said alidade housing having a light transmitting opening in said standard portion within which said vertical circle rotates, means for directing light from said light transmitting opening to said vertical circle, means for directing light from said vertical circle downward within the standard portion within which said vertical circle rotates toward said horizontal circle, a first lens system in the path of the downward directed light imaging graduation lines of said vertical circle onto said surface of said horizontal circle having said protractor scale, means for directing light upward from said horizontal circle and above the center of said horizontal circle within said base portion, a second lens system and reflecting means in the path of said light passing above the center of said horizontal circle imaging the imaged graduation lines of the vertical circle and graduation lines of said single protractor scale on said horizontal circle, said imaged graduation lines of said horizontal protractor scale being imaged along side of and parallel to 180° opposite graduation lines on said horizontal circle and the numbers corresponding to the imaged graduation lines of said horizontal scale being imaged on the opposite end of the parallel graduation lines from the numbers corresponding to the 180° opposite graduation lines, means for directing the light from said horizontal circle upward through the other standard portion of the alidade, a reflector for directing the upward passing light inward along the horizontal axis of the telescope, an index glass in the optical path at the upper end of said other standard portion, a third lens system in the path of the upward projected light in said other standard portion imaging the imaged graduation lines of the vertical circle and the parallel graduation lines and numbers of said horizontal circle onto said index glass, means for masking out one set of numbers of said horizontal scale, optical micrometer means for reading the vertical circle lines and the parallel horizontal circle lines imaged on said index glass, a partially light transmitting reflector reflecting some of the light passing inward along the horizontal axis after passing through said index glass in a direction parallel to the line of sight of said telescope, an eyepiece adjacent the eyepiece of the main telescope for observing said index glass and a reflector at the intersection of the horizontal axis and the main telescope axis for receiving the light transmitted by said partially light transmitting reflector to illuminate the reticle of the main telescope during night time use.

References Cited in the file of this patent

UNITED STATES PATENTS

| | | |
|---|---|---|
| 1,542,397 | Konig | June 16, 1925 |
| 2,144,696 | Weniger | Jan. 24, 1939 |
| 2,221,317 | Wild | Nov. 12, 1940 |
| 2,359,484 | Link et al. | Oct. 3, 1944 |
| 2,363,877 | Larsen et al. | Nov. 28, 1944 |
| 2,480,237 | Godfrey et al. | Aug. 30, 1949 |
| 2,498,273 | Hillman | Feb. 21, 1950 |
| 2,552,893 | Hillman et al. | May 15, 1951 |

FOREIGN PATENTS

| | | |
|---|---|---|
| 387,776 | Great Britain | Feb. 16, 1933 |
| 591,704 | Germany | Jan. 25, 1934 |
| 541,948 | Great Britain | Dec. 18, 1941 |
| 745,953 | Germany | Dec. 13, 1944 |
| 427,993 | Italy | Dec. 3, 1947 |